US012596313B2

(12) United States Patent
Nakamura et al.

(10) Patent No.: US 12,596,313 B2
(45) Date of Patent: Apr. 7, 2026

(54) ELECTROSTATIC CHARGE IMAGE DEVELOPING GREEN TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Yukiaki Nakamura, Kanagawa (JP); Takahisa Tatekawa, Kanagawa (JP); Kohei Manabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 524 days.

(21) Appl. No.: 18/154,048

(22) Filed: Jan. 13, 2023

(65) Prior Publication Data

US 2023/0384699 A1 Nov. 30, 2023

(30) Foreign Application Priority Data

May 27, 2022 (JP) ................................. 2022-086990

(51) Int. Cl.

*G03G 9/09* (2006.01)
*G03G 9/087* (2006.01)
*G03G 13/01* (2006.01)

(52) U.S. Cl.

CPC ......... *G03G 9/091* (2013.01); *G03G 9/08728* (2013.01); *G03G 13/0133* (2021.01); *G03G 2215/066* (2013.01); *G03G 2221/183* (2013.01)

(58) Field of Classification Search

CPC ............... G03G 9/091; G03G 9/08728; G03G 13/0133; G03G 2215/066; G03G 2221/183

See application file for complete search history.

(56) References Cited

U.S. PATENT DOCUMENTS 8,431,294 B2 4/2013 Haruki et al.
8,568,947 B2 10/2013 Ohno et al.
(Continued)

FOREIGN PATENT DOCUMENTS

EP 0350099 1/1990
EP 3610330 2/2020
(Continued)

OTHER PUBLICATIONS

"Search Report of Europe Counterpart Application", issued on Oct. 6, 2023, p. 1-p. 6.
(Continued)

*Primary Examiner* — Mark F. Huff
*Assistant Examiner* — Boone Alexander Evans
(74) *Attorney, Agent, or Firm* — JCIPRNET

(57) ABSTRACT

An electrostatic charge image developing green toner contains green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, in which a mass-based ratio M2/M1 of a content M2 of the non-fluorescent pigment to a content M1 of the azomethine fluorescent pigment is 0.05 or more and 1.5 or less, and a total content of the azomethine fluorescent pigment and the
(Continued)

non-fluorescent pigment with respect to a total amount of the green toner particles is 5% by mass or more and 15% by mass or less.

17 Claims, 2 Drawing Sheets

(56) References Cited

U.S. PATENT DOCUMENTS

| | | | | |
|---|---|---|---|---|
| 11,884,816 | B2 | 1/2024 | Nakamura et al. | |
| 2005/0195420 | A1* | 9/2005 | Gerrits | G03G 15/01 358/1.13 |
| 2009/0239164 | A1* | 9/2009 | Kouyama | G03G 9/09392 430/105 |
| 2015/0248074 | A1* | 9/2015 | Suzuki | G03G 9/0926 430/105 |
| 2017/0145236 | A1 | 5/2017 | Harada | |
| 2021/0018855 | A1* | 1/2021 | Sawada | G03G 9/0922 |
| 2021/0253750 | A1 | 8/2021 | Kembo et al. | |
| 2021/0294233 | A1* | 9/2021 | Lu | G03G 9/0804 |

FOREIGN PATENT DOCUMENTS

| | | |
|---|---|---|
| EP | 3865941 | 8/2021 |
| JP | 2011128414 | 6/2011 |
| JP | 2012189989 | 10/2012 |
| JP | 2016017135 | 2/2016 |
| JP | 2017003818 | 1/2017 |
| JP | 2021127431 | 9/2021 |

OTHER PUBLICATIONS

"Notice of Reasons for Refusal of Japan Counterpart Application", issued on Dec. 9, 2025, with English translation thereof, pp. 1-5.

* cited by examiner

ELECTROSTATIC CHARGE IMAGE DEVELOPING GREEN TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-086990 filed May 27, 2022.

BACKGROUND

(i) Technical Field

The present disclosure relates to an electrostatic charge image developing green toner, an electrostatic charge image developer, a toner cartridge, a process cartridge, an image forming apparatus, and an image forming method.

(ii) Related Art

JP2012-189989A discloses an electrostatic charge image developing green toner containing C.I. Solvent Green 5 and a phthalocyanine-based colorant compound X, in which a content of the C.I. Solvent Green 5 in the total amount of colorants is 5% by mass or more and 50% by mass or less.

JP2016-017135A discloses a colorant composition containing a copper phthalocyanine pigment, a fluorescent dye, and a resin binder, in which a hue angle of the composition with which white paper is coated is 236° or less, and the fluorescent dye allows a coating film consisting of the fluorescent dye not including a copper phthalocyanine pigment and the resin binder to have a maximum reflectance of 90% to 130% in a visible reflection spectrum.

JP2011-128414A discloses an electrostatic charge image developing toner containing a non-fluorescent yellow dye that has a peak wavelength in a wavelength region of 400 to 480 nm in an absorption spectrum and a fluorescent dye that has a peak wavelength in a wavelength region of 480 to 560 nm in an emission spectrum, in which a content of the non-fluorescent dye is 2 to 8 parts by mass with respect to 100 parts by mass of a binder resin, a content of the fluorescent dye is 0.05 to 0.2 parts by mass with respect to 100 parts by mass of the binder resin, and a ratio of content represented by Formula (content of non-fluorescent dye/content of fluorescent dye) is in a range of 15 to 150.

JP2017-003818A discloses a toner in which in a case where mass-based contents of a coloring pigment and a fluorescent dye are represented by $W_G$ and $W_F$ respectively, $W_G \times 0.5 > W_F > W_G \times 0.025$ is satisfied, and in a case where $P_G$ represents a peak absorption wavelength of the coloring pigment and $P_F$ represents an emission peak wavelength of the fluorescent dye, $P_G < P_F$ is satisfied.

SUMMARY

Generally, the image display portion of an electronic device adopts a so-called RGB color mode in which colors are expressed by combinations of three colors, red (R), green (G), and blue (B).

In contrast, an electrophotographic image forming method generally adopts a so-called CMYK color mode in which colors are expressed by combinations of four colors, cyan (C), magenta (M), yellow (Y), and black (K).

In a case where an image expressed in the RGB color mode is reproduced on a recording medium in the CMYK color mode, a secondary color such as green, pink, or orange tends to be dull.

In order to enhance the color reproducibility of green, pink, or orange in the electrophotographic image forming method, a green toner, a pink toner, or an orange toner has been developed. As the green toner, a toner containing a yellow fluorescent dye (for example, C.I. Solvent Green 5) and a green pigment or a blue pigment is known.

Here, because a fluorescent dye usually causes concentration quenching in which light emission is attenuated as the concentration of the fluorescent dye increases, it is difficult to reproduce a color having higher brightness and high chroma with a green toner containing a fluorescent dye and a pigment.

The present disclosure has been made under the above circumstances.

Aspects of non-limiting embodiments of the present disclosure relate to an electrostatic charge image developing green toner that can form a green image having higher brightness and chroma, compared to an electrostatic charge image developing green toner containing C.I. Solvent Green 5 as a yellow fluorescent coloring material.

Aspects of non-limiting embodiments of the present disclosure relate to a green toner that can form a green image having a brightness L* of 70 or more, a chroma C* of 85 or more, and a hue angle h of 128.5° or more and 144.5° or less in the CIE1976 L*a*b* color system.

Aspects of non-limiting embodiments of the present disclosure relate to a green toner that can form a green image having a color difference ΔE of 13.5 or less from a color sample TOKA FLASH VIVA DX 650 in the CIE1976 L*a*b* color system.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific means for achieving the above objects include the following aspects.

According to an aspect of the present disclosure, there is provided an electrostatic charge image developing green toner including green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, in which a mass-based ratio M2/M1 of a content M2 of the non-fluorescent pigment to a content M1 of the azomethine fluorescent pigment is 0.05 or more and 1.5 or less, and a total content of the azomethine fluorescent pigment and the non-fluorescent pigment with respect to a total amount of the green toner particles is 5% by mass or more and 15% by mass or less.

BRIEF DESCRIPTION OF THE DRAWINGS

Exemplary embodiment(s) of the present invention will be described in detail based on the following figures, wherein.

DETAILED DESCRIPTION

Figure 1:
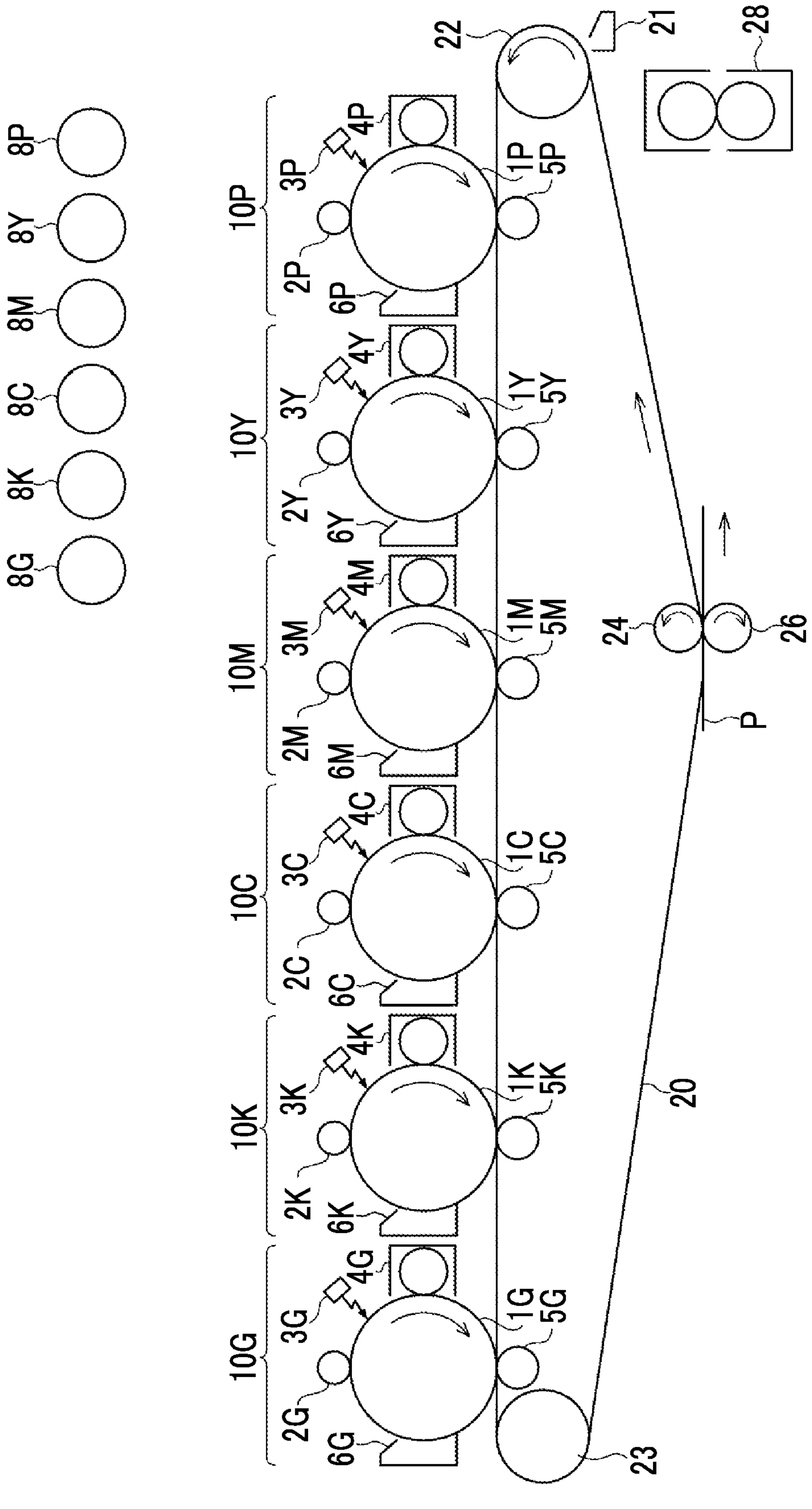
FIG. 1 is a view schematically showing the configuration of an example of an image forming apparatus according to the present exemplary embodiment.

The exemplary embodiments of the present disclosure will be described below. The following descriptions and examples merely illustrate the exemplary embodiments, and do not limit the scope of the exemplary embodiments.

In the present disclosure, a range of numerical values described using "to" represents a range including the numerical values listed before and after "to" as the minimum value and the maximum value respectively.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, the term "step" includes not only an independent step but a step which is not clearly distinguished from other steps as long as the goal of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of corresponding substances. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, "(meth)acryl" is an expression including both the acryl and methacryl, and "(meth)acrylate" is an expression including both the acrylate and methacrylate.

In the present disclosure, "electrostatic charge image developing toner" is also called "toner", "electrostatic charge image developing green toner" is also called "green toner", "electrostatic charge image developer" is also called "developer", and "electrostatic charge image developing carrier" is also called "carrier".

Electrostatic Charge Image Developing Green Toner

In the present disclosure, the green toner means a toner that forms a solid image (an image having a density of 100%) having a hue angle h of 128.5° or more and 144.5° or less on coated paper. The hue angle h is an angle calculated by the following equation from the a* value and the b* value in the CIE1976 L*a*b* color system.

$$\text{Hue angle } h=\tan^{-1}(b^*/a^*)$$

In the present disclosure, the hue angle h of the solid image that the green toner forms on coated paper is, for example, preferably 131° or more and 143° or less, and more preferably 135° or more and 140° or less.

In the present disclosure, it is preferable that the solid image (the image having a density of 100%) formed on coated paper by the green toner have, for example, a brightness L* of 70 or more and a chroma C* of 85 or more in the CIE1976 L*a*b* color system. The chroma C* is a value calculated by the equation from the a* value and the b* value in the CIE1976 L*a*b* color system.

$$\text{Chroma } C^*=\{(a^*)^2+(b^*)^2\}^{0.5}$$

In the present disclosure, a fluorescent pigment refers to a pigment that emits light by light energy from the outside, and a non-fluorescent pigment refers to a pigment that does not emit light by light energy from the outside. Generally, a fluorescent pigment shows color by reflected light and light emission, and a non-fluorescent pigment shows color only by reflected light.

The green toner according to the present exemplary embodiment contains green toner particles. The green toner particles contain a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum.

That is, the green toner particles in the present exemplary embodiment are toner particles containing a yellow fluorescent pigment and a green pigment or a blue pigment.

Hereinafter, "azomethine fluorescent pigment having an emission peak in a wavelength region of 500 nm or more and 550 nm or less in an emission spectrum" will be called "azomethine fluorescent pigment (Y)", and "non-fluorescent pigment having a reflection peak in a wavelength region of 480 nm or more and 540 nm or less in a reflection spectrum" will be called "pigment (G)".

In the green toner particles of the first exemplary embodiment, a mass-based ratio M2/M1 of a content M2 of the pigment (G) to a content M1 of the azomethine fluorescent pigment (Y) is 0.05 or more and 1.5 or less.

In a case where the ratio M2/M1 is less than 0.05, the tone of the green image is yellowish. In a case where the ratio M2/M1 is more than 1.5, the tone of the green image is bluish. From the viewpoint of matching the hue of the green image with the color sample TOKA FLASH VIVA DX 650, the ratio M2/M1 is 0.05 or more and 1.5 or less, and is, for example, preferably 0.1 or more and 1.0 or less, and more preferably 0.3 or more and 0.8 or less.

In the green toner particles of the first exemplary embodiment, the total content of the azomethine fluorescent pigment (Y) and the pigment (G) with respect to the total amount of the green toner particles is 5% by mass or more and 15% by mass or less.

In a case where the total content of the two pigments is less than 5% by mass, the chroma of the green image is reduced. From the viewpoint of increasing the chroma of the green image, the total content of the two pigments is 5% by mass or more, and is, for example, preferably 8% by mass or more and more preferably 10% by mass or more.

In a case where the total content of the two pigments is more than 15% by mass, the brightness of the green image is reduced. From the viewpoint of increasing the brightness of the green image, the total content of the two pigments is 15% by mass or less, and is, for example, preferably 14% by mass or less and more preferably 12% by mass or less.

From the viewpoint of increasing the brightness and chroma of the green image, a wavelength difference between the emission peak of the azomethine fluorescent pigment (Y) which has the highest content among the azomethine fluorescent pigments (Y) contained in the green toner particles in the first exemplary embodiment and the reflection peak of the pigment (G) which has the highest content among the pigments (G) contained in the green toner particles of the first exemplary embodiment is, for example, preferably 40 nm or less. For example, the smaller the wavelength difference between the emission peak and the reflection peak, the more preferable. The wavelength difference is more preferably 30 nm or less, even more preferably nm or less, still more preferably 10 nm or less, yet more preferably 5 nm or less, and ideally nm.

In all combinations of the emission peak of the azomethine fluorescent pigment (Y) contained in the green toner particles of the first exemplary embodiment and the reflection peak of the pigment (G) contained in the green toner particles of the first exemplary embodiment, from the viewpoint of increasing the brightness and chroma of the green image, the wavelength difference between the emission peak and the reflection peak is preferably, for example, 40 nm or less. For example, the smaller the wavelength difference between the emission peak and the reflection peak, the more preferable. The wavelength difference is more preferably 30 nm or less, even more preferably 20 nm or less, still more preferably 10 nm or less, yet more preferably nm or less, and ideally 0 nm.

In a case where a solid image (an image having a density of 100%) is formed on coated paper by the green toner according to a second exemplary embodiment, the solid image has a color difference ΔE between the solid image and a color sample TOKA FLASH VIVA DX 650 (T&K TOKA Corporation) is 13.5 or less in the CIE1976 L*a*b* color system. For example, the smaller the color difference ΔE, the more preferable. The color difference ΔE is preferably 10 or less, more preferably 6.5 or less, even more preferably 3 or less, yet more preferably 1 or less, and ideally 0.

In the second exemplary embodiment, the color difference ΔE relating to the green toner from the color sample TOKA FLASH VIVA DX 650 (T&K TOKA Corporation) in the CIE1976 L*a*b* color system is defined by the following equation.

$$\Delta E=\sqrt{(L_1-L_2)^2+(a_1-a_2)^2+(b_1-b_2)^2}$$

In the above equation, $L_1$, $a_1$, $b_1$, $L_2$, $a_2$, and $b_2$ are the L* value, a* value, and b* value in the CIE1976 L*a*b* color system. $L_1$, $a_1$, and $b_1$ are the L* value, a* value, and b* value of the color sample TOKA FLASH VIVA DX 650, which are obtained by measuring the color sample TOKA FLASH VIVA DX 650 with a reflection spectrodensitometer. $L_2$, $a_2$, and $b_2$ are the L* value, a* value, and b* value of the image formed of the green toner, which are obtained by measuring the image with a reflection spectrodensitometer. The color sample TOKA FLASH VIVA DX 650 (T&K TOKA Corporation) is a color sample composed of coated paper and an image formed thereon. For the image formed of the green toner, the color difference ΔE is also measured using a sample composed of coated paper and the image formed thereon.

In the second exemplary embodiment, the coordinate values of the green toner in the CIE1976 L*a*b* color system are measured by the following method.

The green toner to be a sample is mixed with a carrier, and the mixture is put in a developing device of an image forming apparatus and used to form a solid image (an image having a density of 100%) on coated paper at a fixing temperature of 180° C. and a toner application amount of 4.0 $g/m^2$. The coordinate values of the formed solid image in the CIE1976 L*a*b* color system are measured at 10 random locations by using a reflection spectrodensitometer, and the average of the L* values, a* values, and b* values is calculated.

In the green toner particles of the second exemplary embodiment have, for example, a mass-based ratio M2/M1 of a content M2 of the pigment (G) to a content M1 of the azomethine fluorescent pigment (Y) is preferably 0.05 or more and 1.5 or less, more preferably 0.1 or more and 1.0 or less, and even more preferably 0.3 or more and 0.8 or less.

In the green toner particles of the second exemplary embodiment, for example, the total content of the azomethine fluorescent pigment (Y) and the pigment (G) with respect to the total amount of the green toner particles is preferably 5% by mass or more and 15% by mass or less, more preferably 8% by mass or more and 14% by mass or less, and even more preferably 10% by mass or more and 12% by mass or less.

The wavelength difference between the emission peak of the azomethine fluorescent pigment (Y) which has the highest content among the azomethine fluorescent pigments (Y) contained in the green toner particles of the second exemplary embodiment, and the reflection peak of the pigment (G) which has the highest content among the pigments (G) contained in the green toner particles of the second exemplary embodiment is, for example, preferably 40 nm or less, more preferably 30 nm or less, even more preferably 20 nm or less, still more preferably nm or less, yet more preferably 5 nm or less, and ideally 0 nm.

In all combinations of the emission peak of the azomethine fluorescent pigment (Y) contained in the green toner particles of the second exemplary embodiment and the reflection peak of the pigment (G) contained in the green toner particles of the second exemplary embodiment, the wavelength difference between the emission peak and the reflection peak is, for example, preferably 40 nm or less, more preferably 30 nm or less, even more preferably 20 nm or less, still more preferably 10 nm or less, yet more preferably 5 nm or less, and ideally 0 nm.

From the viewpoint of increasing the brightness and chroma of the green image and reducing the color difference ΔE, the wavelength difference between the emission peak of the azomethine fluorescent pigment (Y) which has the highest content among the azomethine fluorescent pigments (Y) contained in the green toner particles of the second exemplary embodiment and the reflection peak of the pigment (G) which has the highest content among the pigments (G) contained in the green toner particles of the second exemplary embodiment is, for example, preferably 0 nm or more and 30 nm or less, and more preferably 5 nm or more and nm or less.

In all combinations of the emission peak of the azomethine fluorescent pigment (Y) contained in the green toner particles of the second exemplary embodiment and the reflection peak of the pigment (G) contained in the green toner particles of the second exemplary embodiment, the wavelength difference between the emission peak and the reflection peak is, for example, preferably 0 nm or more and 30 nm or less, and more preferably 5 nm or more and nm or less.

It is preferable that the solid image formed on coated paper by using the green toner according to the first and second exemplary embodiments have a reflectance of, for example, 70% or more at the reflection peak in a spectral reflection spectrum.

Hereinafter, the configuration of the green toner according to the present exemplary embodiment will be specifically described.

Green Toner Particles

The green toner particles contain a binder resin, the azomethine fluorescent pigment (Y), and the pigment (G). As necessary, the green toner particles also contain a release agent and other additives.

Azomethine Fluorescent Pigment (Y)

The azomethine fluorescent pigment (Y) has an emission peak in a wavelength region of 500 nm or more and 550 nm or less in an emission spectrum. The emission peak of the azomethine fluorescent pigment (Y) is, for example, preferably in a wavelength region of 505 nm or more and 540 nm or less, more preferably in a wavelength region of 510 nm or more and 535 nm or less, and even more preferably in a wavelength region of 515 nm or more and 530 nm or less.

The azomethine fluorescent pigment (Y) is a pigment having an azomethine structure (that is, —$R^1C$═N— where $R^1$ is a hydrogen atom or a monovalent substituent) in a molecule. The azomethine fluorescent pigment (Y) is, for example, preferably bisazomethine, that is, a compound having —$R^1C$═N—N═$CR^{2-}$ ($R^1$ and $R^2$ each independently represent a hydrogen atom or a monovalent substituent) in a molecule.

Examples of the azomethine fluorescent pigment (Y) include the azomethine compounds (1) to (3).

Azomethine compound (1)

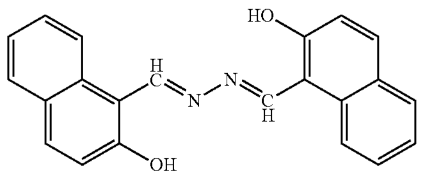

Azomethine compound (2)

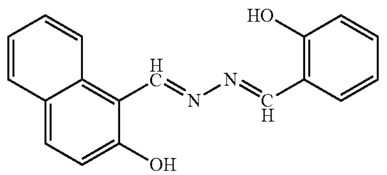

Azomethine compound (3)

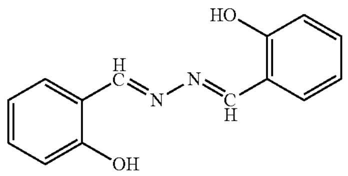

The emission peak of the azomethine compound (1) is 520 nm.

The emission peak of the azomethine compound (2) is 510 nm.

The emission peak of the azomethine compound (3) is 520 nm.

The azomethine fluorescent pigment (Y) is, for example, preferably at least one kind of compound selected from the group consisting of the azomethine compound (1), the azomethine compound (2), and the azomethine compound (3).

As the azomethine fluorescent pigment (Y), for example, C.I. Pigment Yellow 101 is preferable. C.I. Pigment Yellow 101 is the azomethine compound (1).

In order that the dispersibility in the toner particles, color showing properties on a recording medium, fixing properties on a recording medium, and the like are achieved in well-balanced manner, the volume-average particle size D1 of the azomethine fluorescent pigment (Y) is, for example, preferably 50 nm or more and 800 nm or less, more preferably 150 nm or more and 600 nm or less, and even more preferably 250 nm or more and 400 nm or less.

The volume-average particle size of the pigment is measured using a laser diffraction-type particle size distribution analyzer (for example, LA-700 manufactured by Horiba, Ltd.) by dispersing the pigment in an aqueous solution of a surfactant. The volume-based particle size distribution is plotted from the small particle size, and the particle size at which the cumulative percentage of the particles reaches 50% is adopted as the volume-average particle size.

Pigment (G)

The pigment (G) has a reflection peak in a wavelength region of 480 nm or more and 540 nm or less in a reflection spectrum. The reflection peak of the pigment (G) is, for example, preferably in a wavelength region of 485 nm or more and 535 nm or less, more preferably in a wavelength region of 490 nm or more and 530 nm or less, and even more preferably in a wavelength region of 495 nm or more and 525 nm or less.

Examples of the pigment (G) include a halogenated phthalocyanine compound and a lake pigment of a triphenylmethane dye.

As the pigment (G), for example, a halogenated phthalocyanine compound is preferable, and at least one kind of compound selected from the group consisting of halogenated copper phthalocyanine and halogenated zinc phthalocyanine is more preferable.

Examples of the halogenated copper phthalocyanine include C.I. Pigment Green 7 (reflection peak 500 nm), C.I. Pigment Green 36 (reflection peak 510 nm), and C.I. Pigment Blue 76 (reflection peak 490 nm).

Examples of the halogenated zinc phthalocyanine include C.I. Pigment Green 58 (reflection peak 515 nm) and C.I. Pigment Green 59 (reflection peak 520 nm).

The pigment (G) is, for example, even more preferably at least one kind of pigment selected from the group consisting of C.I. Pigment Green 7, C.I. Pigment Green 36, C.I. Pigment Green 58, C.I. Pigment Green 59, and C.I. Pigment Blue 76.

In order that the dispersibility in the toner particles, color showing properties on a recording medium, fixing properties on a recording medium, and the like are achieved in well-balanced manner, the volume-average particle size D2 of the pigment (G) is, for example, preferably 50 nm or more and 300 nm or less, more preferably 100 nm or more and 250 nm or less, and even more preferably 120 nm or more and 200 nm or less.

The volume-average particle size of the pigment is measured using a laser diffraction-type particle size distribution analyzer (for example, LA-700 manufactured by Horiba, Ltd.) by dispersing the pigment in an aqueous solution of a surfactant. The volume-based particle size distribution is plotted from the small particle size, and the particle size at which the cumulative percentage of the particles reaches 50% is adopted as the volume-average particle size.

From the viewpoint of increasing the brightness and chroma of the green image, the ratio D1/D2 of the volume-average particle size D1 of the azomethine fluorescent pigment (Y) to the volume-average particle size D2 of the pigment (G) is, for example, preferably 1 or more and 3 or less, more preferably 1.2 or more and 2.5 or less, and even more preferably 1.5 or more and 2 or less.

The green toner particles may contain other colorants in addition to the azomethine fluorescent pigment (Y) and the pigment (G).

The total amount of the azomethine fluorescent pigment (Y) and the pigment (G) with respect to the total amount of colorants contained in the green toner particles is, for example, preferably 90% by mass or more, more preferably 95% by mass or more, and even more preferably 100% by mass.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

As the binder resin, for example, a polyester resin is preferable.

Examples of the polyester resin include known polyester resins.

Examples of the polyester resin include a polycondensate of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is, for example, preferably or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC•HCL-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the reaction, for example, the monomer with poor compatibility may be condensed in advance with an acid or an alcohol that is to be polycondensed with the monomer, and then polycondensed with the major component.

The content of the binder resin with respect to the total mass of the toner particles is, for example, preferably 40% by mass or more and 95% by mass or less, more preferably 50% by mass or more and 90% by mass or less, and even more preferably 60% by mass or more and 85% by mass or less.

Release Agent

Examples of the release agent include hydrocarbon-based wax; natural wax such as carnauba wax, rice wax, and candelilla wax; synthetic or mineral·petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total mass of the toner particles is, for example, preferably 1% by mass or more and 20% by mass or less, and more preferably 5% by mass or more and 15% by mass or less.

Other Additives

Examples of other additives include known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core/shell structure that is configured with a core portion (core particle) and a coating layer (shell layer) covering the core portion.

The toner particles having a core/shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are plotted from small-sized particles. The particle size at which the cumulative percentage of particles is 16% is defined as volume-based particle size D16v and a number-based particle size D16p. The particle size at which the cumulative percentage of particles is 50% is defined as volume-average particle size D50v and a cumulative number-average particle size D50p. The particle size at which the cumulative percentage of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (circular equivalent perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Then, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

External Additive

Examples of the external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, $MgSO_4$, and the like.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, an aluminum-based coupling agent, and the like. One kind of each of these agents may be used alone, or two or more kinds of these agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

The amount of external additives added to the exterior of the toner particles with respect to the toner particles is, for example, preferably 0.01% by mass or more and 5% by mass or less, and more preferably 0.01% by mass or more and 2.0% by mass or less.

Manufacturing Method of Green Toner

The green toner according to the present exemplary embodiment is obtained by manufacturing green toner particles and then adding external additives to the exterior of the green toner particles.

The green toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and known manufacturing methods are adopted. Among the above methods, for example, the aggregation and coalescence method may be used for obtaining toner particles.

In a case where the green toner particles are manufactured by the aggregation and coalescence method, for example, the following manufacturing method is preferable.

A manufacturing method having a step of preparing a resin particle dispersion in which resin particles to be a binder resin are dispersed (a resin particle dispersion-preparing step);

- a step of preparing a fluorescent pigment (Y) dispersion in which the azomethine fluorescent pigment (Y) is dispersed (a fluorescent pigment (Y) dispersion-preparing step);
- a step of preparing a pigment (G) dispersion in which the pigment (G) is dispersed (a pigment (G) dispersion-preparing step);
- a step of forming aggregated particles by aggregating mixed particles in a mixed dispersion obtained by mixing together the resin particle dispersion, the fluorescent pigment (Y) dispersion, and the pigment (G) dispersion (aggregated particle-forming step); and
- a step of coalescing the aggregated particles by heating an aggregated particle dispersion, in which the aggregated particles are dispersed, to form green toner particles (coalescence step).

Hereinafter, each of the steps will be specifically described. In the following description, the green toner particles will be simply called toner particles. In the following section, a method of obtaining toner particles containing a release agent will be described. The release agent is used as necessary.

Resin Particle Dispersion-Preparing Step

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes phase transition from W/O to O/W and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less. For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is plotted for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

The method of preparing a release agent particle dispersion is the same as the method of preparing the resin particle dispersion. The content of the release agent particles contained in the release agent particle dispersion is, for example, preferably 5% by mass or more and 50% by mass or less, and more preferably 10% by mass or more and 40% by mass or less.

Fluorescent Pigment (Y) Dispersion-Preparing Step

The fluorescent pigment (Y) dispersion is prepared, for example, by dispersing the azomethine fluorescent pigment (Y) in a dispersion medium by using a surfactant.

Examples of the dispersion medium used for the fluorescent pigment (Y) dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

Examples of the method of dispersing the azomethine fluorescent pigment (Y) in a dispersion medium include dispersion methods using a rotary shearing homogenizer, a ball mill having media, a sand mill, a dyno mill, a key mill, and the like.

The volume-average particle size of the azomethine fluorescent pigment (Y) dispersed in the fluorescent pigment (Y) dispersion is, for example, preferably 50 nm or more and 800 nm or less, more preferably 150 nm or more and 600 nm or less, and even more preferably 250 nm or more and 400 nm or less. The particle size of the azomethine fluorescent pigment (Y) can be adjusted, for example, by the method and time of the dispersion treatment.

The content of the azomethine fluorescent pigment (Y) in the fluorescent pigment (Y) dispersion is, for example, preferably 5% by mass or more and 50% by mass or less, and more preferably 10% by mass or more and 40% by mass or less.

Pigment (G) Dispersion-Preparing Step

The pigment (G) dispersion is prepared, for example, by dispersing the pigment (G) in a dispersion medium by using a surfactant.

Examples of the dispersion medium used for the pigment (G) dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

Examples of the method of dispersing the pigment (G) in a dispersion medium include dispersion methods using a rotary shearing homogenizer, a ball mill having media, a sand mill, a dyno mill, a key mill, and the like.

The volume-average particle size of the pigment (G) dispersed in the pigment (G) dispersion is, for example, preferably 50 nm or more and 300 nm or less, more preferably 100 nm or more and 250 nm or less, and even more preferably 120 nm or more and 200 nm or less. The particle size of the pigment (G) can be adjusted, for example, by the method and time of the dispersion treatment.

The content of the pigment (G) contained in the pigment (G) dispersion is, for example, preferably 5% by mass or more and 50% by mass or less, and more preferably 10% by mass or more and 40% by mass or less.

Aggregated Particle-Forming Step

The resin particle dispersion, the fluorescent pigment (Y) dispersion, the pigment (G) dispersion, and the release agent particle dispersion are mixed together. Then, in the mixed dispersion, the resin particles, the azomethine fluorescent pigment (Y), the pigment (G), and the release agent particles are hetero-aggregated such that aggregated particles are formed which have a diameter close to the diameter of the target toner particles and include the resin particles, the azomethine fluorescent pigment (Y), the pigment (G), and the release agent particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Then, the dispersion is heated to a temperature close to the glass transition temperature of the resin particles (specifically, for example, to a temperature equal to or higher than the glass transition temperature of the resin particles−30° C. and equal to or lower than the glass transition temperature of the resin particles−10° C.) such that the particles dispersed in the mixed dispersion are aggregated, thereby forming aggregated particles.

In the aggregated particle-forming step, for example, in a state where the mixed dispersion is being stirred with a rotary shearing homogenizer, an aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) such that the aggregated particles coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed so as to cause the resin particles to be aggregated and adhere to the surface of the aggregated particles and to form second aggregated particles, and a step of heating a second aggregated particle dispersion in which the second aggregated particles are dispersed so as to cause the second aggregated particles to coalesce and to form toner particles having a core/shell structure.

After the coalescence step ends, the toner particles in the dispersion are subjected to known washing step, solid-liquid separation step, and drying step, thereby obtaining dry toner particles. As the washing step, from the viewpoint of charging properties, for example, displacement washing may be thoroughly performed using deionized water. As the solid-liquid separation step, from the viewpoint of productivity, for example, suction filtration, pressure filtration, or the like may be performed. As the drying step, from the viewpoint of productivity, for example, freeze-drying, flush drying, fluidized drying, vibratory fluidized drying, or the like may be performed.

For example, by adding an external additive to the obtained dry toner particles and mixing together the external additive and the toner particles, the toner according to the present exemplary embodiment is manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the green toner according to the present exemplary embodiment.

The electrostatic charge image developer according to the present exemplary embodiment may be a one-component developer which contains only the green toner according to the present exemplary embodiment or a two-component developer which is obtained by mixing together the green toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin and; a resin impregnation-type carrier obtained by impregnating porous magnetic powder with a resin; and the like.

Each of the magnetic powder dispersion-type carrier and the resin impregnation-type carrier may be a carrier obtained by coating the surface of a core material, which is particles configuring the carrier, with a resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like.

Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the green toner and the carrier, represented by green toner:carrier, in the two-component developer is, for example, preferably 1:100 to 30:100, and more preferably 3:100 to 20:100.

Image Forming Apparatus and Image Forming Method

The image forming apparatus and image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; an apparatus including a cleaning unit that cleans the surface of the image holder before charging after the transfer of the toner image; and an apparatus including a charge neutralizing unit that neutralizes charge by irradiating the surface of the image holder with charge neutralizing light before charging after the transfer of the toner image.

In a case where the image forming apparatus according to the present exemplary embodiment is the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) detachable from the image forming apparatus. As the process cartridge, for example, a process cartridge is suitably used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

In the following section, as an example of the image forming apparatus according to the present exemplary embodiment, a 6-unit tandem image forming apparatus having an array of 6 image forming units will be described. The tandem image forming apparatus is not limited to this, and may be a 5-unit tandem image forming apparatus having an array of 5 image forming units, a 4-unit tandem image forming apparatus having an array of 4 image forming units, or the like.

FIG. 1 is a view schematically showing the configuration of the image forming apparatus according to the present exemplary embodiment, which shows an intermediate transfer-type 6-unit tandem image forming apparatus.

The image forming apparatus shown in FIG. 1 includes first to sixth image forming units 10Y, 10M, 10C, 10K, and 10G as electrophotographic image forming means that print out images of colors, pink (P), yellow (Y), magenta (M), cyan (C), black (K), and green (G) based on color-separated image data. These image forming units (hereinafter, simply called "units" in some cases) 10P, 10Y, 10M, 10C, 10K, and 10G are arranged in a row in the horizontal direction in a state of being spaced apart by a predetermined distance. The units 10P, 10Y, 10M, 10C, and 10G may be process cartridges that are detachable from the image forming apparatus.

An intermediate transfer belt (an example of an intermediate transfer member) 20 passing through the units 10P, 10Y, 10M, 10C, 10K, and 10G extends under the units. The intermediate transfer belt 20 is looped around a driving roll 22, a support roll 23, and an opposing roll 24 that are in contact with the inner surface of the intermediate transfer belt 20, and runs toward a sixth unit 10G from a first unit 10P. An intermediate transfer member cleaning device 21 facing the driving roll 22 is provided on the side of the image holding surface of the intermediate transfer belt 20.

Toners of pink, yellow, magenta, cyan, black, and green stored in containers of the toner cartridges 8P, 8Y, 8M, 8C, 8K, and 8G are supplied to developing devices (an example of developing units) 4P, 4Y, 4M, 4C, 4K, and 4G of units 10P, 10Y, 10M, 10C, 10K, and 10G respectively.

The first to sixth units 10P, 10Y, 10M, 10C, 10K, and 10G have the same configuration and perform the same operation. Therefore, in the present specification, as a representative, the sixth unit 10G that forms a green image will be described.

The sixth unit 10G has a photoreceptor 1G that acts as an image holder. Around the photoreceptor 1G, a charging roll 2G (an example of charging unit) that charges the surface of the photoreceptor 1G at a predetermined potential, an exposure device 3G (an example of electrostatic charge image forming unit) that exposes the charged surface to a laser beam based on color-separated image signals so as to form an electrostatic charge image, a developing device 4G (an example of developing unit) that develops the electrostatic charge image by supplying a toner to the electrostatic charge image, a primary transfer roll 5G (an example of primary transfer unit) that transfers the developed toner image onto the intermediate transfer belt 20, and a photoreceptor cleaning device 6G (an example of cleaning unit) that removes the residual toner on the surface of the photoreceptor 1G after the primary transfer are arranged in this order.

The primary transfer roll 5G is disposed on the inner side of the intermediate transfer belt 20, at a position facing the photoreceptor 1G. A bias power supply (not shown in the drawing) for applying a primary transfer bias is connected to primary transfer rolls 5Y, 5P, 5M, 5G, and 5K of each unit. Each bias power supply changes the transfer bias applied to each primary transfer roll under the control of a control unit not shown in the drawing.

Hereinafter, the operation that the sixth unit 10G carries out to form a green image will be described.

First, prior to the operation, the surface of the photoreceptor 1G is charged to a potential of −600 V to −800 V by the charging roll 2G.

The photoreceptor 1G is formed of a photosensitive layer laminated on a conductive (for example, volume resistivity at 20° C.: $1\times10^{-6}$ Ωcm or less) substrate. The photosensitive layer has properties in that although this layer usually has a high resistance (resistance of a general resin), in a case where the photosensitive layer is irradiated with a laser beam, the specific resistance of the portion irradiated with the laser beam changes. Therefore, from an exposure device 3G, the laser beam is radiated to the surface of the charged photoreceptor 1G according to the image data for green transmitted from the control unit not shown in the drawing. As a result, an electrostatic charge image of the green image pattern is formed on the surface of the photoreceptor 1G.

The electrostatic charge image is an image formed on the surface of the photoreceptor 1G by charging. This image is a so-called negative latent image formed in a manner in which the charges with which the surface of the photoreceptor 1G is charged flow due to the reduction in the specific resistance of the portion of the photosensitive layer irradiated with the laser beam from the exposure device 3G, but the charges in a portion not being irradiated with the laser beam remain.

The electrostatic charge image formed on the photoreceptor 1G rotates to a predetermined development position as the photoreceptor 1G runs. At the development position, the electrostatic charge image on the photoreceptor 1G is developed as a toner image by the developing device 4G and visualized.

The developing device 4G contains, for example, an electrostatic charge image developer that contains at least a green toner and a carrier. By being agitated in the developing device 4G, the green toner undergoes triboelectrification, carries charges of the same polarity (negative polarity) as the charges with which the surface of the photoreceptor 1G is charged, and is held on a developer roll (an example of a developer holder). Then, as the surface of the photoreceptor 1G passes through the developing device 4G, the green toner electrostatically adheres to the neutralized latent image portion on the surface of the photoreceptor 1G, and the latent image is developed by the green toner. The photoreceptor 1G on which the green toner image is formed keeps on running at a predetermined speed, and the toner image developed on the photoreceptor 1G is transported to a predetermined primary transfer position.

In a case where the green toner image on the photoreceptor 1G is transported to the primary transfer position, a primary transfer bias is applied to the primary transfer roll 5G, and electrostatic force heading for the primary transfer roll 5G from the photoreceptor 1G acts on the toner image. As a result, the toner image on the photoreceptor 1G is transferred onto the intermediate transfer belt 20. The transfer bias applied at this time has a polarity (+) opposite to the polarity (−) of the toner. In the sixth unit 10G, the transfer bias is set, for example, to +10 μA under the control of the control unit (not shown in the drawing).

The photoreceptor 1G having transferred the toner image to the intermediate transfer belt 20 keeps rotating to come into contact with a cleaning blade included in a photoreceptor cleaning device 6G. The residual toner on the photoreceptor 1G is removed by the photoreceptor cleaning device 6G and collected.

The intermediate transfer belt 20 is sequentially transported through the first to sixth image forming units 10P, 10Y, 10M, 10C, 10K, and 10G, and the toner images of each color are superposed and transferred in layers.

The intermediate transfer belt 20, to which the toner images of six colors are transferred in layers through the first to six units, reaches a secondary transfer portion configured with the intermediate transfer belt 20, the opposing roll 24 in contact with the inner surface of the intermediate transfer belt, and a secondary transfer roll 26 (an example of a secondary transfer unit) disposed on the side of the image holding surface of the intermediate transfer belt 20. Meanwhile, via a supply mechanism, recording paper P (an example of a recording medium) is supplied at a predetermined timing to the gap between the secondary transfer roll 26 and the intermediate transfer belt 20 that are in contact with each other. Furthermore, secondary transfer bias is applied to the opposing roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

The intermediate transfer belt 20 having transferred the toner image to the recording paper P keeps running to come into contact with a cleaning blade included in the intermediate transfer member cleaning device 21. The residual toner on the intermediate transfer belt 20 is removed by the intermediate transfer member cleaning device 21 and collected.

The recording paper P onto which the toner image is transferred is transported into a pressure contact portion (nip portion) of a pair of fixing rolls in the fixing device 28 (an example of a fixing unit), the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth. For instance, coated paper prepared by coating the surface of plain paper with a resin or the like, art paper for printing, and the like are suitably used.

The recording paper P on which the color image has been fixed is transported to an output portion, and a series of color image forming operations is finished.

Process Cartridge and Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing unit and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
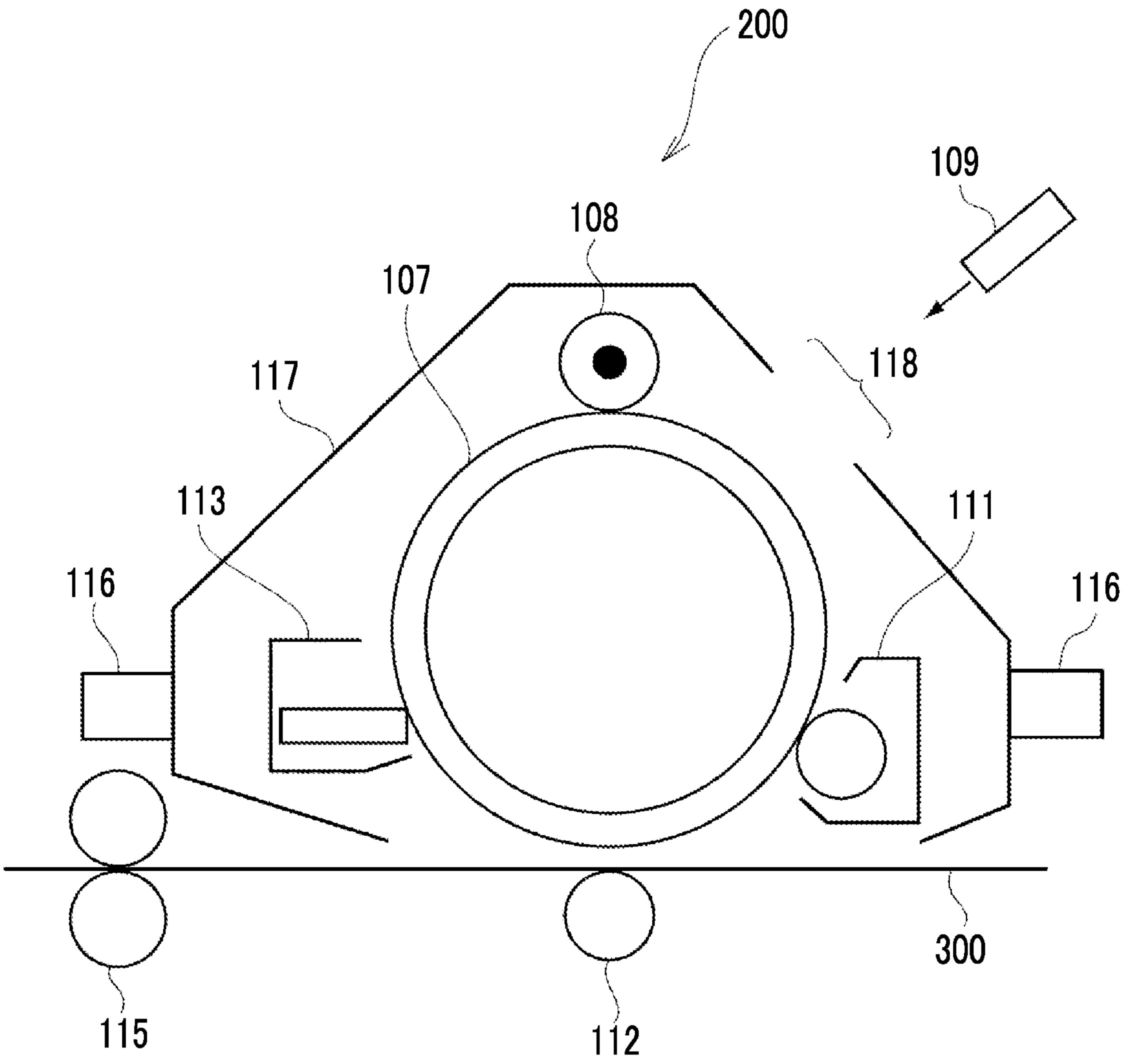
FIG. 2 is a view schematically showing the configuration of an example of a process cartridge detachable from the image forming apparatus according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of an image holder), a charging roll 108 (an example of a charging unit) that is provided on the periphery of the photoreceptor 107, a developing device 111 (an example of a developing unit), a photoreceptor cleaning device 113 (an example of a cleaning unit), which are integrally combined and held in the housing 117. The process cartridge 200 forms a cartridge in this way.

In FIG. 2, 109 represents an exposure device (an example of an electrostatic charge image forming unit), 112 represents a transfer device (an example of a transfer unit), 115 represents a fixing device (an example of a fixing unit), and 300 represents recording paper (an example of a recording medium).

Next, the toner cartridge according to the present exemplary embodiment will be described.

The toner cartridge according to the present exemplary embodiment is a toner cartridge including a container that contains the green toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8P, 8M, 8C, 8G, and 8K to be detachable from the apparatus. The developing devices 4Y, 4P, 4M, 4C, 4G, and 4K are connected to toner cartridges corresponding to the respective colors by a toner supply pipe not shown in the drawing. In a case where the amount of the toner contained in the container of the toner cartridge is low, the toner cartridge is replaced. The toner cartridge 8G is an example of the toner cartridge according to the present exemplary embodiment, and has a container that contains the green toner according to the present exemplary embodiment. The toner cartridges 8P, 8Y, 8M, 8C, and 8K have containers that contain pink, yellow, magenta, cyan, and black toners respectively.

EXAMPLES

Hereinafter, exemplary embodiments of the invention will be specifically described based on examples. However, the exemplary embodiments of the invention are not limited to the examples.

In the following description, unless otherwise specified, "parts" and "%" are based on mass.

Unless otherwise specified, synthesis, treatment, manufacturing, and the like are carried out at room temperature (25° C.±3° C.).

Carrier

Cyclohexyl methacrylate resin (weight-average molecular weight 50,000): 54 parts Carbon black (manufactured by Cabot Corporation, VXC72): 6 parts Toluene: 250 parts Isopropyl alcohol: 50 parts The above materials and glass beads (diameter 1 mm, the same amount as toluene) are put in a sand mill and stirred at a rotation speed of 190 rpm for 30 minutes, thereby obtaining a coating agent.

Ferrite particles (1,000 parts, volume-average particle size of 35 μm) and 150 parts of the coating agent are put in a kneader and mixed together at room temperature (25° C.) for 20 minutes. Then, the mixture is heated to 70° C. and dried under reduced pressure. The dried product is cooled to room temperature (25° C.), taken out of the kneader, and sieved with a mesh having an opening size of 75 μm to remove coarse powder, thereby obtaining a carrier.

Cyan toner and Cyan Developer

Preparation of Resin Particle Dispersion (1)

Ethylene glycol: 37 parts

Neopentyl glycol: 65 parts 1,9-Nonanediol: 32 parts

Terephthalic acid: 96 parts

The above materials are put in a flask, the temperature is raised to 200° C. for 1 hour, and after it is confirmed that the inside of the reaction system is uniformly stirred, 1.2 parts of dibutyltin oxide is added. The temperature is raised to 240° C. for 6 hours in a state where the generated water is being distilled off, and stirring is continued at 240° C. for 4 hours, thereby obtaining an amorphous polyester resin (weight-average molecular weight 13,000, glass transition temperature 62° C.). Molten amorphous polyester resin is transferred as it is to an emulsifying disperser (CAVITRON CD1010, Eurotech Ltd.) at a rate of 100 g/min. Separately, dilute aqueous ammonia having a concentration of 0.37% obtained by diluting the reagent aqueous ammonia with deionized water is put in a tank and transferred to the emulsifying disperser together with the polyester resin at a rate of 0.1 L/min while being heated at 120° C. by a heat exchanger. The emulsifying disperser is operated under the conditions of a rotation speed of a rotor of 60 Hz and a pressure of 5 kg/cm 2, thereby obtaining a resin particle dispersion (1) having a volume-average particle size of 160 nm and a solid content of 20%.

Preparation of Release Agent Particle Dispersion (W)

Paraffin wax (HNP-9, NIPPON SEIRO CO., LTD.): 50 parts

Anionic surfactant (NEOGEN RK, DKS Co. Ltd.): 2 parts

Deionized water: 200 parts

The above materials are heated to 120° C., thoroughly dispersed with a homogenizer (ULTRA-TURRAX T50, manufactured by IKA), and then subjected to a dispersion treatment with a pressure jet-type homogenizer. At a point in time when the volume-average particle size reaches 200 nm, the dispersed resultant is collected, thereby obtaining a release agent particle dispersion (W) having a solid content of 20%.

Preparation of Colorant Particle Dispersion (C)

Cyan pigment (C.I. Pigment Blue 15: 3, Dainichiseika Color & Chemicals Mfg. Co., Ltd.): 50 parts Anionic surfactant (NEOGEN RK, DKS Co. Ltd.): 2 parts Deionized water: 200 parts The above materials are mixed together and dispersed for 1 hour with a high-pressure impact disperser (ULTIMIZER HJP30006, manufactured by SUGINO MACHINE LIMITED), thereby obtaining a colorant particle dispersion (C) having a volume-average particle size of 180 nm and a solid content of 20%.

Preparation of Cyan Toner Particles

Resin particle dispersion (1): 200 parts

Release agent particle dispersion (W): 35 parts

Colorant particle dispersion (C): 25 parts

Polyaluminum chloride: 0.4 parts

Deionized water: 100 parts

The above materials are put in a round stainless steel flask, thoroughly mixed and dispersed together by using a homogenizer (ULTRA-TURRAX T50, IKA), and then heated to 48° C. in an oil bath for heating in a state where the inside of the flask is being stirred. The internal temperature of the reaction system is kept at 48° C. for 60 minutes, and then 70 parts of the resin particle dispersion (1) is slowly added thereto. Thereafter, the pH is adjusted to 8.0 by using a 0.5 mol/L aqueous sodium hydroxide solution, the flask is then sealed, heated to 90° C. while being continuously stirred with a stirring shaft with a magnetic seal, and kept at 90° C. for 30 minutes. Next, the mixture is cooled at a cooling rate of 5° C./min, subjected to solid-liquid separation, and thoroughly washed with deionized water. Then, the mixture is subjected to solid-liquid separation, redispersed in deionized water at 30° C., and stirred and washed at a rotation speed of 300 rpm for 15 minutes. This washing operation is repeated 6 more times, and at a point time when the pH of the filtrate reaches 7.54 and the electrical conductivity thereof reaches 6.5 μS/cm, solid-liquid separation is performed. The solids are dried in a vacuum for 24 hours, thereby obtaining cyan toner particles. The volume-average particle size of the cyan toner particles is 5.7 μm.

Preparation of Cyan Toner and Cyan Developer

Hydrophobic silica particles (1.5 parts, RY50 manufactured by Nippon Aerosil Co., Ltd.) are added to 100 parts of cyan toner particles, and the particles are mixed together at 13,000 rpm for 30 seconds by using a sample mill. Then, the mixture is sieved using a vibration sieve having an opening size of 45 μm, thereby obtaining a toner containing external additives.

The toner containing external additives (10 parts) and 100 parts of the carrier are put in a V blender and stirred for 20 minutes. Then, the mixture is sieved using a sieve having an opening size of 212 μm, thereby obtaining a cyan developer.

Yellow Toner and Yellow Developer

A yellow toner and a yellow developer are manufactured by the same treatment as that used for manufacturing the cyan toner and the cyan developer, except that the cyan pigment (C.I. Pigment Blue 15: 3, Dainichiseika Color & Chemicals Mfg. Co., Ltd.) is changed to a yellow pigment (C.I. Pigment Yellow 74, Dainichiseika Color & Chemicals Mfg. Co., Ltd.)

Example 1: Green Toner and Green Developer

Preparation of Resin Particle Dispersion (1)

Ethylene glycol: 37 parts
Neopentyl glycol: 65 parts
1,9-Nonanediol: 32 parts
Terephthalic acid: 96 parts The above materials are put in a flask, the temperature is raised to 200° C. for 1 hour, and after it is confirmed that the inside of the reaction system is uniformly stirred, 1.2 parts of dibutyltin oxide is added. The temperature is raised to 240° C. for 6 hours in a state where the generated water is being distilled off, and stirring is continued at 240° C. for 4 hours, thereby obtaining an amorphous polyester resin (weight-average molecular weight 13,000, glass transition temperature 62° C.). Molten amorphous polyester resin is transferred as it is to an emulsifying disperser (CAVITRON CD1010, Eurotech Ltd.) at a rate of 100 g/min. Separately, dilute aqueous ammonia having a concentration of 0.37% obtained by diluting the reagent aqueous ammonia with deionized water is put in a tank and transferred to the emulsifying disperser together with the polyester resin at a rate of 0.1 L/min while being heated at 120° C. by a heat exchanger. The emulsifying disperser is operated under the conditions of a rotation speed of a rotor of 60 Hz and a pressure of 5 kg/cm 2, thereby obtaining a resin particle dispersion (1) having a volume-average particle size of 160 nm and a solid content of 20%.

Preparation of Release Agent Particle Dispersion (W)

Paraffin wax (HNP-9, NIPPON SEIRO CO., LTD.): 50 parts
Anionic surfactant (NEOGEN RK, DKS Co. Ltd.): 2 parts
Deionized water: 200 parts The above materials are heated to 120° C., thoroughly dispersed with a homogenizer (ULTRA-TURRAX T50, manufactured by IKA), and then subjected to a dispersion treatment with a pressure jet-type homogenizer. At a point in time when the volume-average particle size reaches 200 nm, the dispersed resultant is collected, thereby obtaining a release agent particle dispersion (W) having a solid content of 20%.

Preparation of Pigment Dispersion (Y101)

C.I. Pigment Yellow 101: 70 parts
Anionic surfactant (DKS Co. Ltd., NEOGEN RK): 30 parts (solid content 20%)
Deionized water: 200 parts The above materials are mixed together and pulverized with a continuous key mill (KMC-3, INOUE MFG., INC.) to a volume-average particle size of 300 nm. The solid content is adjusted to 20%, thereby obtaining a pigment dispersion (Y101).

Preparation of Pigment Dispersion (PG36)

C.I. Pigment Green 36: 70 parts
Anionic surfactant (DKS Co. Ltd., NEOGEN RK): 30 parts (solid content 20%)
Deionized water: 200 parts The above materials are mixed together and pulverized with a continuous key mill (KMC-3, INOUE MFG., INC.) to a volume-average particle size of 150 nm. The solid content is adjusted to 20%, thereby obtaining a pigment dispersion (PG36).

Preparation of Green Toner Particles

Resin particle dispersion (1) (solid content 20%): 182.5 parts
Release agent particle dispersion (W) (solid content 20%): 35 parts
Pigment dispersion (Y101) (solid content 20%): 28.3 parts
Pigment dispersion (PG36) (solid content 20%): 14.2 parts
Polyaluminum chloride: 0.4 parts
Deionized water: 100 parts The above materials are put in a round stainless steel flask, thoroughly mixed and dispersed together by using a homogenizer (ULTRA-TURRAX T50, IKA), and then heated to 48° C. in an oil bath for heating in a state where the inside of the flask is being stirred. The internal temperature of the reaction system is kept at 48° C. for 60 minutes, and then 70 parts of the resin particle dispersion (1) (solid content 20%) is slowly added thereto. Thereafter, the pH is adjusted to 8.0 by using a 0.5 mol/L aqueous sodium hydroxide solution, the flask is then sealed, heated to 90° C. while being continuously stirred with a stirring shaft with a magnetic seal, and kept at 90° C. for 30 minutes. Next, the mixture is cooled at a cooling rate of 5° C./min, subjected to solid-liquid separation, and thoroughly washed with deionized water. Then, the mixture is subjected to solid-liquid separation, redispersed in deionized water at 30° C., and stirred and washed at a rotation speed of 300 rpm for 15 minutes. This washing operation is repeated 6 more times, and at a point time when the pH of the filtrate reaches 7.54 and the electrical conductivity thereof reaches 6.5 μS/cm, solid-liquid separation is performed. The solids are dried in a vacuum for 24 hours, thereby obtaining green toner particles. The volume-average particle size of the green toner particles is 5.6 μm.

Preparation of Green Toner and Green Developer

Hydrophobic silica particles (1.5 parts, RY50 manufactured by Nippon Aerosil Co., Ltd.) are added to 100 parts of the green toner particles, and the particles are mixed together at 13,000 rpm for 30 seconds by using a sample mill. Then, the mixture is sieved using a vibration sieve having an opening size of 45 thereby obtaining a toner containing external additives.

The toner containing external additives (10 parts) and 100 parts of the carrier are put in a V blender and stirred for 20 minutes. Then, the mixture is sieved using a sieve having an opening size of 212 thereby obtaining a green developer.

Examples 2 to 20 and Comparative Examples 6 to 10

Green toner particles, a green toner, and a green developer are manufactured by the same treatment as in Example 1, except that the type of non-fluorescent pigment and the content and particle size of the pigment are changed as shown in Tables 1 and 2. The particle size of the pigment is controlled by the treatment time of the continuous key mill in preparing the pigment dispersion.

Comparative Example 1

Preparation of Dye-Containing Resin Particle Dispersion
C.I. Solvent Green 5: 2 parts
Amorphous polyester resin (weight-average molecular weight 13,000, glass transition temperature 62° C.): 100 parts The above materials are heated and mixed together such that the dye is kneaded into the resin. The kneaded product is rolled and cooled to a temperature equal to or lower than 30° C. The obtained kneaded product is coarsely pulverized with a hammer mill to a size of 1 mm or less, and then finely pulverized with a jet mill (AFG, Hosokawa Micron Group). The particles obtained by fine pulverization are mixed with 30 parts (solid content 20%) of an anionic surfactant (DKS Co. Ltd., NEOGEN RK) and 200 parts of deionized water, and the mixture is pulverized with a continuous key mill (KMC-3, INOUE MFG., INC.) to a volume-average particle size of 200 nm. The solid content is adjusted to 20%, thereby obtaining a dye-containing resin particle dispersion (SG5).

Preparation of Green Toner Particles

Green toner particles are obtained by the same treatment as in Example 1, except that the pigment dispersion (Y101) is changed to the dye-containing resin particle dispersion (SG5), and the amount of the resin particle dispersion (1) used is adjusted. The volume-average particle size of the green toner particles is 5.6

Preparation of Green Toner and Green Developer

Hydrophobic silica particles (1.5 parts, RY50 manufactured by Nippon Aerosil Co., Ltd.) are added to 100 parts of the green toner particles, and the particles are mixed together at 13,000 rpm for 30 seconds by using a sample mill. Then, the mixture is sieved using a vibration sieve having an opening size of 45 μm, thereby obtaining a toner containing external additives.

The toner containing external additives (10 parts) and 100 parts of the carrier are put in a V blender and stirred for 20 minutes. Then, the mixture is sieved using a sieve having an opening size of 212 μm, thereby obtaining a green developer.

Comparative Examples 2 to 5

Green toner particles, green toners, and green developers are manufactured by the same treatment as in Comparative Example 1, except that the type of non-fluorescent pigment and the content of pigments are changed as shown in Table 1.

Example 21

Green toner particles, a green toner, and a green developer are manufactured by the same treatment as in Example 1, except that 182.5 parts of the resin particle dispersion (1) used first is changed to 91.3 parts of the resin particle dispersion (1) and 91.3 parts of the resin particle dispersion (2).

The resin particle dispersion (2) is the following resin particle dispersion which is a dispersion of an amorphous polyester resin.

Resin Particle Dispersion (2)
Ethylene glycol: 41 parts
1,5-Pentanediol: 48 parts
Terephthalic acid: 70 parts
Fumaric acid: 30 parts The above materials are put in a reaction vessel including a stirring device, a nitrogen introduction tube, a temperature sensor, and a rectifying column. In a nitrogen gas stream, the temperature is raised to 220° C. for an hour, and titanium tetraethoxide is added thereto in an amount of 1 part with respect to a total of 100 parts of the above materials. While the generated water is being distilled off, the temperature is raised to 240° C. for 0.5 hours, a dehydrocondensation reaction is continued for 1 hour at 240° C. Then, the reactant is cooled, thereby obtaining an amorphous polyester resin (weight-average molecular weight of 96,000, glass transition temperature of 61° C.). Ethyl acetate (40 parts) and 25 parts of 2-butanol are put in a container equipped with a temperature control unit and a nitrogen purge unit, thereby preparing a mixed solvent. Then, 100 parts of the amorphous polyester resin is slowly added to and dissolved in the solvent, a 10% aqueous ammonia solution (in an amount equivalent to 3 times the acid value of the resin in terms of molar ratio) is added thereto, and the mixed solution is stirred for 30 minutes. Thereafter, the reaction container is cleaned out by dry nitrogen purging, and in a state where the mixed solution is being stirred at a temperature kept at 40° C., 400 parts of deionized water is added dropwise thereto at a rate of 2 parts/min such that the mixed solution is emulsified. After dropwise addition ends, the emulsion is returned to 25° C., and the solvent is removed under reduced pressure, thereby obtaining a resin particle dispersion in which resin particles having a volume-average particle size of 160 nm are dispersed. Deionized water is added to the resin particle dispersion such that the solid content thereof is adjusted to 20%, thereby obtaining a resin particle dispersion (2).

Example 22

Green toner particles, a green toner, and a green developer are manufactured by the same treatment as in Example 1, except that 182.5 parts of the resin particle dispersion (1) used first is changed to 152.5 parts of the resin particle dispersion (1) and 30 parts of the resin particle dispersion (3).

The resin particle dispersion (3) is the following resin particle dispersion which is a dispersion of a crystalline polyester resin.

Preparation of Resin Particle Dispersion (3)
Decanedioic acid: 81 parts
Hexanediol: 47 parts The above materials are put in a flask, the temperature is raised to 160° C. for 1 hour, and after it is confirmed that the inside of the reaction system is uniformly stirred, 0.03 parts of dibutyltin oxide is added. While the generated water is being distilled off, the temperature is raised to 200° C. for 6 hours, and stirring is continued for 4 hours at 200° C. Thereafter, the reaction solution is cooled, solid-liquid separation is performed, and the solid is dried at a temperature of 40° C. under reduced pressure, thereby obtaining a crystalline polyester resin (weight-average molecular weight of 15,000 and melting point of 64° C.).

Crystalline polyester resin: 50 parts

Anionic surfactant (NEOGEN RK, DKS Co. Ltd.): 2 parts

Deionized water: 200 parts

The above materials are heated to 120° C., thoroughly dispersed with a homogenizer (ULTRA-TURRAX T50, manufactured by IKA), and then subjected to a dispersion treatment with a pressure jet-type homogenizer. At a point in time when the volume-average particle size reaches 180 nm, the dispersed resultant is collected, thereby obtaining a resin particle dispersion (3) having a solid content of 20%.

Example 23

Preparation of Green Toner Particles

Amorphous polyester resin (weight-average molecular weight 13,000, glass transition temperature 62° C.): 155.4 parts C.I. Pigment Yellow 101: 16 parts C.I. Pigment Green 36: 8 parts Paraffin wax (HNP-9, NIPPON SEIRO CO., LTD.): 20.6 parts The above materials are put in a Henschel mixer (FM75L, NIPPON COKE & ENGINEERING. CO., LTD.) and mixed together by rotation at a rotation speed of 20/sec for 15 minutes, thereby obtaining a toner composition. Next, the mixture is kneaded with a twin-screw kneading extruder (TEM-48SS, SHIBAURA MACHINE CO., LTD.) set to a temperature of 150° C., the kneaded product is rolled and cooled to a temperature equal to lower than 30° C. The obtained kneaded product is coarsely pulverized with a hammer mill to a size of 1 mm or less, and then finely pulverized with a jet mill (AFG, Hosokawa Micron Group). The pulverized resultant is classified with an elbow jet classifier (EJ-LABO, Nittetsu Mining Co., Ltd.), thereby obtaining green toner particles having a volume-average particle size of 6.5 μm.

Preparation of Green Toner and Green Developer

Hydrophobic silica particles (1.5 parts, RY50 manufactured by Nippon Aerosil Co., Ltd.) are added to 100 parts of the green toner particles, and the particles are mixed together at 13,000 rpm for 30 seconds by using a sample mill. Then, the mixture is sieved using a vibration sieve having an opening size of 45 thereby obtaining a toner containing external additives.

The toner containing external additives (10 parts) and 100 parts of the carrier are put in a V blender and stirred for 20 minutes. Then, the mixture is sieved using a sieve having an opening size of 212 μm, thereby obtaining a green developer.

Performance Evaluation

Image Formation

As an image forming apparatus for forming an image for evaluation, modified ColorPress 1000 (FUJIFILM Business Innovation Corp.) is prepared, a developer is put in the developing device thereof, and a toner is put in the container of the toner cartridge thereof.

A solid image (density 100%, size 5 cm×5 cm, toner application amount 4.0 g/m$^2$) of a solid green color is formed on A4 size coated paper (OS coated paper, 127 g/m$^2$, FUJIFILM Business Innovation Corp.). The fixing temperature is 180° C.

In Reference Example 1 where green is expressed as a secondary color by using a yellow toner and a cyan toner, the yellow toner application amount is 4.0 g/m$^2$ and the cyan toner application amount is 4.0 g/m$^2$. The fixing temperature is 180° C.

Brightness, Chroma, and Hue Angle

By using s reflection spectrodensitometer X-Rite 939 (aperture size 4 mm, X-Rite Inc.), the L* value, a* value, and b* value in the CIE1976 L*a*b* color system are measured at 10 locations in the solid image, and the average of the L* value, a* value, and b* value is calculated. Furthermore, the chroma C* and the hue angle h are calculated from the following equations. The results are shown in Tables 1 and 2. A desirable brightness L* is, for example, 70 or more, and a desirable chroma C* is, for example, 85 or more.

$$\text{Chroma } C^*=\{(a^*)^2+(b^*)^2\}^{0.5}$$

$$\text{Hue angle } h=\tan^{-1}(b^*/a^*)$$

Color Difference from Color Sample

Based on the following equation, the color difference ΔE between the solid image and the color sample TOKA FLASH VIVA DX 650 (T&K TOKA Corporation) is calculated. The results are shown in Tables 1 and 2.

$$\Delta E=\sqrt{(L_1-L_2)^2+(a_1-a_2)^2+(b_1-b_2)^2}$$

$L_1$, $a_1$, and $b_1$ are the L* value, a* value, and b* value of the color sample TOKA FLASH VIVA DX 650, and $L_2$, $a_2$, and $b_2$ are the L* value, a* value, and b* value of the solid image of examples. The color sample TOKA FLASH VIVA DX 650 has an L* value of 77.7, an a* value of −69.0, and a b* value of 65.9.

TABLE 1

| | Yellow fluorescent pigment or fluorescent dye | | | | Non-fluorescent pigment | | | | Wavelength difference between emission peak and reflection peak (compared with pigment having highest content) |
|---|---|---|---|---|---|---|---|---|---|
| | Type — | Emission peak nm | Volume-average particle size D1 nm | Content M1 % by mass | Type — | Reflection peak nm | Volume-average particle size D2 nm | Content M2 % by mass | nm |
| Reference Example 1 | Forming green image as secondary color by using yellow toner and cyan toner | | | | | | | | — |
| Comparative Example 1 | SG5 | 520 | — | 1.27 | PG36 | 510 | 150 | 4 | 10 |
| Comparative Example 2 | SG5 | 520 | — | 1.27 | PG59 | 520 | 150 | 4 | 0 |

TABLE 1-continued

| | | | | | | | | | |
|---|---|---|---|---|---|---|---|---|---|
| Comparative Example 3 | SG5 | 520 | — | 1.27 | PG58 | 515 | 150 | 4 | 5 |
| Comparative Example 4 | SG5 | 520 | — | 1.27 | PG7 | 500 | 150 | 3 | 20 |
| Comparative Example 5 | SG5 | 520 | — | 1.27 | PB76 | 490 | 150 | 2 | 30 |
| Comparative Example 6 | PY101 | 520 | 300 | 8 | PB15:3 | 470 | 150 | 1 | 50 |
| Example 1 | PY101 | 520 | 300 | 8 | PG36 | 510 | 150 | 4 | 10 |
| Example 2 | PY101 | 520 | 300 | 8 | PG36 | 510 | 150 | 3 | 10 |
| | | | | | PG59 | 520 | 150 | 1 | |
| Example 3 | PY101 | 520 | 300 | 8 | PG36 | 510 | 150 | 3 | 10 |
| | | | | | PB76 | 490 | 150 | 1 | |
| Example 4 | PY101 | 520 | 300 | 8 | PG59 | 520 | 150 | 4 | 0 |
| Example 5 | PY101 | 520 | 300 | 8 | PG58 | 515 | 150 | 4 | 5 |
| Example 6 | PY101 | 520 | 300 | 8 | PG7 | 500 | 150 | 4 | 20 |
| Example 7 | PY101 | 520 | 300 | 8 | PB76 | 490 | 150 | 4 | 30 |

| | Content ratio M2/M1 — | Total content of coloring materials M1 + M2 % by mass | Particle size ratio D1/D2 — | Color difference from color sample ΔE | Brightness L* — | Chroma C* — | Hue angle h Degree |
|---|---|---|---|---|---|---|---|
| Reference Example 1 | — | — | — | 28.4 | 61 | 74 | 131.7 |
| Comparative Example 1 | 3.15 | 5.27 | — | 23.4 | 77 | 72 | 138.4 |
| Comparative Example 2 | 3.15 | 5.27 | — | 19.2 | 76 | 76 | 137.1 |
| Comparative Example 3 | 3.15 | 5.27 | — | 21.6 | 74 | 74 | 137.7 |
| Comparative Example 4 | 2.36 | 4.27 | — | 22.3 | 72 | 75 | 139.9 |
| Comparative Example 5 | 1.57 | 3.27 | — | 25.3 | 69 | 72 | 140.6 |
| Comparative Example 6 | 0.5 | 12 | 2.0 | 26.8 | 68 | 86 | 139.6 |
| Example 1 | 0.5 | 12 | 2.0 | 0.8 | 78 | 96 | 137.1 |
| Example 2 | 0.5 | 12 | 2.0 | 1.5 | 79 | 96 | 136.7 |
| Example 3 | 0.5 | 12 | 2.0 | 3.1 | 75 | 94 | 137.2 |
| Example 4 | 0.5 | 12 | 2.0 | 4.4 | 81 | 98 | 137.1 |
| Example 5 | 0.5 | 12 | 2.0 | 2.8 | 80 | 97 | 137.1 |
| Example 6 | 0.5 | 12 | 2.0 | 3.1 | 76 | 93 | 137.6 |
| Example 7 | 0.5 | 12 | 2.0 | 9.0 | 71 | 90 | 138.2 |

TABLE 2

| | Yellow fluorescent pigment or fluorescent dye | | | | Non-fluorescent pigment | | | | Wavelength difference |
|---|---|---|---|---|---|---|---|---|---|
| | Type — | Emission peak nm | Volume-average particle size D1 nm | Content M1 % by mass | Type — | Reflection peak nm | Volume-average particle size D2 nm | Content M2 % by mass | between emission peak and reflection peak (compared with pigment having highest content) nm |
| Comparative Example 7 | PY101 | 520 | 300 | 11.5 | PG36 | 510 | 150 | 0.5 | 10 |
| Example 8 | PY101 | 520 | 300 | 11.4 | PG36 | 510 | 150 | 0.6 | 10 |
| Example 9 | PY101 | 520 | 300 | 11 | PG36 | 510 | 150 | 1.1 | 10 |
| Example 10 | PY101 | 520 | 300 | 6.6 | PG36 | 510 | 150 | 5.4 | 10 |
| Example 11 | PY101 | 520 | 300 | 6 | PG36 | 510 | 150 | 6 | 10 |
| Example 12 | PY101 | 520 | 300 | 4.8 | PG36 | 510 | 150 | 7.2 | 10 |
| Comparative Example 8 | PY101 | 520 | 300 | 4.6 | PG36 | 510 | 150 | 7.4 | 10 |
| Comparative Example 9 | PY101 | 520 | 300 | 2.6 | PG36 | 510 | 150 | 1.4 | 10 |

TABLE 2-continued

| | | | | | | | | | |
|---|---|---|---|---|---|---|---|---|---|
| Example 13 | PY101 | 520 | 300 | 3.3 | PG36 | 510 | 150 | 1.7 | 10 |
| Example 14 | PY101 | 520 | 300 | 6.6 | PG36 | 510 | 150 | 3.4 | 10 |
| Example 15 | PY101 | 520 | 300 | 10 | PG36 | 510 | 150 | 5 | 10 |
| Comparative Example 10 | PY101 | 520 | 300 | 10.6 | PG36 | 510 | 150 | 5.4 | 10 |
| Example 16 | PY101 | 520 | 200 | 8 | PG36 | 510 | 250 | 4 | 10 |
| Example 17 | PY101 | 520 | 250 | 8 | PG36 | 510 | 250 | 4 | 10 |
| Example 18 | PY101 | 520 | 300 | 8 | PG36 | 510 | 200 | 4 | 10 |
| Example 19 | PY101 | 520 | 450 | 8 | PG36 | 510 | 150 | 4 | 10 |
| Example 20 | PY101 | 520 | 480 | 8 | PG36 | 510 | 150 | 4 | 10 |
| Example 21 | PY101 | 520 | 300 | 8 | PG36 | 510 | 150 | 4 | 10 |
| Example 22 | PY101 | 520 | 300 | 8 | PG36 | 510 | 150 | 4 | 10 |
| Example 23 | Manufacturing toner particles by kneading and pulverizing method by using PY101 and PG36 | | | | | | | | 10 |

| | Content ratio M2/M1 — | Total content of coloring materials M1 + M2 % by mass | Particle size ratio D1/D2 — | Color difference from color sample ΔE | Brightness L* — | Chroma C* — | Hue angle h Degree |
|---|---|---|---|---|---|---|---|
| Comparative Example 7 | 0.04 | 12 | 2.0 | 14.5 | 81 | 97 | 128.3 |
| Example 8 | 0.05 | 12 | 2.0 | 13.5 | 79 | 97 | 128.8 |
| Example 9 | 0.1 | 12.1 | 2.0 | 9.9 | 78 | 96 | 130.8 |
| Example 10 | 0.8 | 12 | 2.0 | 6.0 | 76 | 95 | 140.1 |
| Example 11 | 1.0 | 12 | 2.0 | 9.4 | 76 | 96 | 142.2 |
| Example 12 | 1.5 | 12 | 2.0 | 13.1 | 75 | 97 | 144.2 |
| Comparative Example 8 | 1.6 | 12 | 2.0 | 14.9 | 73 | 98 | 145.0 |
| Comparative Example 9 | 0.5 | 4 | 2.0 | 14.2 | 85 | 84 | 137.9 |
| Example 13 | 0.5 | 5 | 2.0 | 10.7 | 83 | 86 | 137.8 |
| Example 14 | 0.5 | 10 | 2.0 | 4.4 | 81 | 93 | 136.3 |
| Example 15 | 0.5 | 15 | 2.0 | 9.5 | 70 | 101 | 137.0 |
| Comparative Example 10 | 0.5 | 16 | 2.0 | 11.2 | 69 | 103 | 137.0 |
| Example 16 | 0.5 | 12 | 0.8 | 5.4 | 81 | 100 | 137.0 |
| Example 17 | 0.5 | 12 | 1.0 | 3.7 | 80 | 98 | 137.1 |
| Example 18 | 0.5 | 12 | 1.5 | 2.1 | 79 | 97 | 137.1 |
| Example 19 | 0.5 | 12 | 3.0 | 3.6 | 77 | 92 | 136.8 |
| Example 20 | 0.5 | 12 | 3.2 | 6.3 | 75 | 90 | 137.3 |
| Example 21 | 0.5 | 12 | 2.0 | 1.0 | 77 | 95 | 136.7 |
| Example 22 | 0.5 | 12 | 2.0 | 1.7 | 78 | 95 | 137.6 |
| Example 23 | 0.5 | 12 | — | 6.2 | 74 | 91 | 136.8 |

*Example 21: an example where 2 kinds of amorphous polyester resins are used as binder resins.

*Example 22: an example where 1 kind of amorphous polyester resin and 1 kind of crystalline polyester resin are used as binder resins.

The symbols in Tables 1 and 2 mean the following pigments or dyes.

SG5 . . . C.I. Solvent Green 5 (manufactured by BASF SE, Oracet F Yellow 084, emission peak 520 nm), a type of yellow fluorescent dye PY101 . . . C.I. Pigment Yellow 101 (manufactured by Radiant Color, Radglo VSF-0-01, emission peak 520 nm), a type of azomethine fluorescent pigment (Y)

PG36 . . . C.I. Pigment Green 36 (manufactured by TOYOCOLOR CO., LTD., LIONOL GREEN 8624, reflection peak 510 nm), a type of pigments (G)

PG59 . . . C.I. Pigment Green 59 (manufactured by DIC CORPORATION, FASTOGEN GREEN C100, reflection peak 520 nm), a type of pigment (G)

PG58 . . . C.I. Pigment Green 58 (manufactured by DIC CORPORATION, FASTOGEN GREEN A110, reflection peak 515 nm), a type of pigment (G)

PG7 . . . C.I. Pigment Green 7 (manufactured by TOYOCOLOR CO., LTD., LIONOL GREEN 8390, reflection peak 500 nm), a type of pigment (G)

PB76 . . . C.I. Pigment Blue 76 (manufactured by DIC CORPORATION, FASTOGEN BLUE 10GN, reflection peak 490 nm), a type of pigment (G)

PB15:3 . . . C.I. Pigment Blue 15: 3 (manufactured by TOYOCOLOR CO., LTD., LIONOL BLUE FG-7330, reflection peak 470 nm), a type of non-fluorescent pigment Image Formation by Actual Machine An electrophotographic and intermediate transfer-type 6-unit tandem image forming apparatus is prepared. The 6 developing devices are filled with a pink developer, a yellow developer, a magenta developer, a cyan developer, a black developer, and a green developer (developer of Example 1) respectively. Then, based on the image data obtained by color-separating RGB data into the above 6 colors, an image is formed on A4 size coated paper. The obtained image has excellent color reproducibility close to the original RGB data.

(((1)))

An electrostatic charge image developing green toner comprising:

green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, wherein a mass-based ratio M2/M1 of a content M2 of the non-fluorescent pigment to a content M1 of the azomethine fluorescent pigment is 0.05 or more and 1.5 or less, and a total content of the azomethine fluorescent pigment and the non-fluorescent pigment with respect to a total amount of the green toner particles is 5% by mass or more and 15% by mass or less.

(((2)))

The electrostatic charge image developing green toner according to (((1))), wherein the mass-based ratio M2/M1 of the content M2 of the non-fluorescent pigment to the content M1 of the azomethine fluorescent pigment is 0.1 or more and 1.0 or less, and the total content of the azomethine fluorescent pigment and the non-fluorescent pigment with respect to the total amount of the green toner particles may be 10% by mass or more and 15% by mass or less.

(((3)))

The electrostatic charge image developing green toner according to (((1))) or (((2))), wherein a wavelength difference between the emission peak of the azomethine fluorescent pigment that has a highest content among azomethine fluorescent pigments contained in the green toner particles and the reflection peak of the non-fluorescent pigment that has a highest content among non-fluorescent pigments contained in the green toner particles is nm or less.

(((4)))

The electrostatic charge image developing green toner according to (((1))) or (((2))), wherein a wavelength difference between the emission peak of the azomethine fluorescent pigment that has a highest content among azomethine fluorescent pigments contained in the green toner particles and the reflection peak of the non-fluorescent pigment that has a highest content among non-fluorescent pigments contained in the green toner particles is 20 nm or less.

(((5)))

The electrostatic charge image developing green toner according to any one of (((1))) to (((4))), wherein the azomethine fluorescent pigment is C.I. Pigment Yellow 101.

(((6)))

The electrostatic charge image developing green toner according to any one of (((1))) to (((5))), wherein the non-fluorescent pigment is at least one kind of pigment selected from the Pigment Green 59, and C.I. Pigment Blue 76.

(((7)))

The electrostatic charge image developing green toner according to any one of (((1))) to (((6))), wherein a ratio D1/D2 of a volume-average particle size D1 of the azomethine fluorescent pigment to a volume-average particle size D2 of the non-fluorescent pigment is 1 or more and 3 or less.

(((8)))

The electrostatic charge image developing green toner according to any one of (((1))) to (((7))), wherein a volume-average particle size D1 of the azomethine fluorescent pigment is 50 nm or more and 800 nm or less.

(((9)))

The electrostatic charge image developing green toner according to any one of (((1))) to (((8))), wherein a volume-average particle size D2 of the non-fluorescent pigment is 50 nm or more and 300 nm or less.

(((10)))

An electrostatic charge image developing green toner comprising green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, wherein in a case where a solid image is formed on coated paper, a color difference ΔE between the solid image and a color sample TOKA FLASH VIVA DX 650 is 13.5 or less in a CIE1976 L*a*b* color system.

(((11)))

The electrostatic charge image developing green toner according to (((10))), wherein the azomethine fluorescent pigment is C.I. Pigment Yellow 101.

(((12)))

The electrostatic charge image developing green toner according to (((10))) or (((11))), wherein the non-fluorescent pigment is at least one kind of pigment selected from the Pigment Green 59, and C.I. Pigment Blue 76.

(((13)))

An electrostatic charge image developer comprising the electrostatic charge image developing green toner according to any one of (((1))) to (((12))).

(((14)))

A toner cartridge comprising a container that contains the electrostatic charge image developing green toner according to any one of (((1))) to (((12))), wherein the toner cartridge is detachable from an image forming apparatus.

(((15)))

A process cartridge comprising a developing unit that contains the electrostatic charge image developer according to (((13))) and develops an electrostatic charge image formed on a surface of an image holder as a toner image by using the electrostatic charge image developer, wherein the process cartridge is detachable from an image forming apparatus.

(((16)))

An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to (((13))) and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

(((17)))

An image forming method comprising:

charging a surface of an image holder;

forming an electrostatic charge image on the charged surface of the image holder;

developing the electrostatic charge image formed on the surface of the image holder as a toner image by using the electrostatic charge image developer according to (((13)));

transferring the toner image formed on the surface of the image holder to a surface of a recording medium; and fixing the toner image transferred to the surface of the recording medium.

(((18)))

An image forming apparatus comprising first to sixth electrophotographic image forming units forming images of each of colors of pink, yellow, magenta, cyan, black, and green, wherein an image forming unit that forms a green image contains the electrostatic charge image developer according to (((13))).

(((19)))

An image forming method comprising forming first to sixth electrophotographic images of each of colors of pink, yellow, magenta, cyan, black, and green, wherein the electrostatic charge image developer according to (((13))) is used in forming a green image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing green toner comprising:

green toner particles containing a binder resin, an azomethine fluorescent pigment having an emission peak in a wavelength region of 500 nm or more and 550 nm or less in an emission spectrum, and a non-fluorescent pigment having a reflection peak in a wavelength region of 480 nm or more and 540 nm or less in a reflection spectrum, wherein a mass-based ratio M2/M1 of a content M2 of the non-fluorescent pigment to a content M1 of the azomethine fluorescent pigment is 0.05 or more and 1.5 or less, a total content of the azomethine fluorescent pigment and the non-fluorescent pigment with respect to a total amount of the green toner particles is 5% by mass or more and 15% by mass or less, and wherein the non-fluorescent pigment is at least one kind of pigment selected from the group consisting of C.I. Pigment Green 7, C.I. Pigment Green 36, C.I. Pigment Green 58, and C.I. Pigment Green 59.

2. The electrostatic charge image developing green toner according to claim 1, wherein the mass-based ratio M2/M1 of the content M2 of the non-fluorescent pigment to the content M1 of the azomethine fluorescent pigment is 0.1 or more and 1.0 or less, and the total content of the azomethine fluorescent pigment and the non-fluorescent pigment with respect to the total amount of the green toner particles is 10% by mass or more and 15% by mass or less.

3. The electrostatic charge image developing green toner according to claim 1, wherein a wavelength difference between the emission peak of the azomethine fluorescent pigment having an emission peak in a wavelength region of 500 nm or more and 550 nm or less in an emission spectrum that has a highest content among azomethine fluorescent pigments having an emission peak in a wavelength region of 500 nm or more and 550 nm or less in an emission spectrum contained in the green toner particles and the reflection peak of the non-fluorescent pigment having a reflection peak in a wavelength region of 480 nm or more and 540 nm or less in a reflection spectrum that has a highest content among non-fluorescent pigments having a reflection peak in a wavelength region of 480 nm or more and 540 nm or less in a reflection spectrum contained in the green toner particles is 40 nm or less.

4. The electrostatic charge image developing green toner according to claim 1, wherein a wavelength difference between the emission peak of the azomethine fluorescent pigment having an emission peak in a wavelength region of 500 nm or more and 550 nm or less in an emission spectrum that has a highest content among azomethine fluorescent pigments having an emission peak in a wavelength region of 500 nm or more and 550 nm or less in an emission spectrum contained in the green toner particles and the reflection peak of the non-fluorescent pigment having a reflection peak in a wavelength region of 480 nm or more and 540 nm or less in a reflection spectrum that has a highest content among non-fluorescent pigments having a reflection peak in a wavelength region of 480 nm or more and 540 nm or less in a reflection spectrum contained in the green toner particles is 20 nm or less.

5. The electrostatic charge image developing green toner according to claim 1, wherein the azomethine fluorescent pigment is C.I. Pigment Yellow 101.

6. The electrostatic charge image developing green toner according to claim 1, wherein a ratio D1/D2 of a volume-average particle size D1 of the azomethine fluorescent pigment to a volume-average particle size D2 of the non-fluorescent pigment is 1 or more and 3 or less.

7. The electrostatic charge image developing green toner according to claim 1, wherein a volume-average particle size D1 of the azomethine fluorescent pigment is 50 nm or more and 800 nm or less.

8. The electrostatic charge image developing green toner according to claim 1, wherein a volume-average particle size D2 of the non-fluorescent pigment is 50 nm or more and 300 nm or less.

9. An electrostatic charge image developer comprising: the electrostatic charge image developing green toner according to claim 1.

10. An electrostatic charge image developer comprising: the electrostatic charge image developing green toner according to claim 2.

11. A toner cartridge comprising:

a container that contains the electrostatic charge image developing green toner according to claim 1, wherein the toner cartridge is detachable from an image forming apparatus.

12. A process cartridge comprising:

a developing unit that contains the electrostatic charge image developer according to claim 9 and develops an electrostatic charge image formed on a surface of an image holder as a toner image by using the electrostatic charge image developer, wherein the process cartridge is detachable from an image forming apparatus.

13. An image forming apparatus comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 9 and develops the electrostatic charge image formed on the surface of the image holder as a toner image by using the electrostatic charge image developer;

a transfer unit that transfers the toner image formed on the surface of the image holder to a surface of a recording medium; and a fixing unit that fixes the toner image transferred to the surface of the recording medium.

14. An image forming method comprising:

charging a surface of an image holder;

forming an electrostatic charge image on the charged surface of the image holder;

developing the electrostatic charge image formed on the surface of the image holder as a toner image by using the electrostatic charge image developer according to claim 9;

transferring the toner image formed on the surface of the image holder to a surface of a recording medium; and fixing the toner image transferred to the surface of the recording medium.

15. An image forming apparatus comprising:

a plurality of electrophotographic image forming units, wherein the plurality of electrophotographic image forming units comprises a pink image forming electrophotographic image forming unit, a yellow image forming electrophotographic image forming unit, a magenta image forming electrophotographic image forming unit, a cyan image forming electrophotographic image forming unit, a black image forming electrophotographic image forming unit and a green image forming electrophotographic image forming unit, wherein each of the plurality of electrophotographic image forming units comprises:

an image holder;

a charging unit that charges a surface of the image holder;

an electrostatic charge image forming unit that forms an electrostatic charge image on the charged surface of the image holder;

a developing unit that contains an electrostatic charge image developer and develops the electrostatic charge image formed on the surface of the image holder as a toner image;

a transfer unit that transfers the toner image formed on the surface of the image holder to a surface of a recording medium; and a fixing unit that fixes the toner image transferred to the surface of the recording medium, wherein the green image forming electrophotographic image forming unit contains the electrostatic charge image developer according to claim 9.

16. An image forming method comprising:

forming a plurality of electrophotographic images, wherein the plurality of electrophotographic image comprises a pink electrophotographic image, a yellow electrophotographic image, a magenta electrophotographic image, a cyan electrophotographic image, a black electrophotographic image and a green electrophotographic image, wherein forming the green electrophotographic image comprises:

a charging step of charging a surface of an image holder;

an electrostatic charge image forming step of forming an electrostatic charge image on the charged surface of the image holder;

a developing step of developing the electrostatic charge image formed on the surface of the image holder as a toner image by using the electrostatic charge image developer according to claim 9;

a transfer step of transferring the toner image formed on the surface of the image holder to a surface of a recording medium; and a fixing step of fixing the toner image transferred to the surface of the recording medium wherein electrostatic charge image developer according to claim 13 is used in forming the green electrophotographic image.

17. An electrostatic charge image developing green toner comprising: green toner particles containing a binder resin, at least one azomethine fluorescent pigment selected from the group consisting of following azomethine compounds (1) to (3), and at least one non-fluorescent pigment selected from the group consisting of C.I. Pigment Green 7, C.I. Pigment Green 36, C.I. Pigment Green 58, and C.I. Pigment Green 59:

Azomethine compound (1)

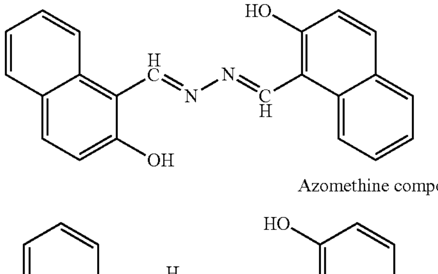

Azomethine compound (2)

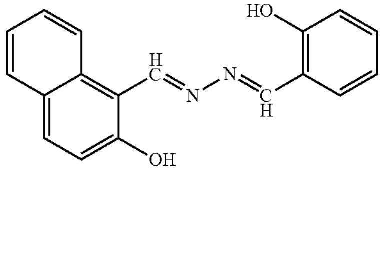

-continued

Azomethine compound (3)

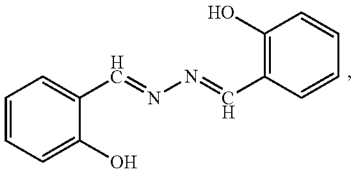

wherein a mass-based ratio M2/M1 of a content M2 of the non-fluorescent pigment to a content M1 of the azomethine fluorescent pigment is 0.05 or more and 1.5 or less, and a total content of the azomethine fluorescent pigment and the non-fluorescent pigment with respect to a total amount of the green toner particles is 5% by mass or more and 15% by mass or less.

* * * * *